United States Patent
Tebrügge

(10) Patent No.: US 12,495,215 B2
(45) Date of Patent: Dec. 9, 2025

(54) DEVICE AND METHOD FOR SYNCHRONIZING A HEADLAMP OF A MOTOR VEHICLE USING A CAMERA

(71) Applicant: Hella GmbH & Co. KGaA, Lippstadt (DE)

(72) Inventor: Claas Tebrügge, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 275 days.

(21) Appl. No.: 18/322,538

(22) Filed: May 23, 2023

(65) Prior Publication Data

US 2023/0388653 A1 Nov. 30, 2023

(30) Foreign Application Priority Data

May 24, 2022 (DE) .......................... 102022113068.1

(51) Int. Cl.
| | | |
|---|---|---|
| H05B 45/30 | (2020.01) | |
| H04N 23/74 | (2023.01) | |
| H04N 25/57 | (2023.01) | |
| H04N 25/78 | (2023.01) | |
| H05B 45/325 | (2020.01) | |
| H05B 47/125 | (2020.01) | |

(52) U.S. Cl.
CPC ............ *H04N 23/74* (2023.01); *H04N 25/57* (2023.01); *H04N 25/78* (2023.01); *H05B 45/325* (2020.01); *H05B 47/125* (2020.01)

(58) Field of Classification Search
CPC ........ H05B 47/10; H05B 47/12; H05B 45/10; H05B 45/30; H05B 45/325; H04N 23/74; H04N 25/57; H04N 25/78
See application file for complete search history.

(56) References Cited

U.S. PATENT DOCUMENTS

| 2022/0229161 A1* | 7/2022 | Kahana | ................. G01S 7/4815 |
| 2025/0240860 A1* | 7/2025 | Krick | .................... H05B 47/16 |

FOREIGN PATENT DOCUMENTS

| DE | 102016007591 A1 | 2/2017 |
| DE | 102015225797 B3 | 5/2017 |
| DE | 102016002590 A1 | 9/2017 |
| DE | 102016003296 A1 | 9/2017 |
| DE | 102017205768 A1 | 10/2018 |

* cited by examiner

*Primary Examiner* — Jimmy T Vu
(74) *Attorney, Agent, or Firm* — Husch Blackwell LLP

(57) ABSTRACT

A device is provided including a headlamp including imaging elements for the targeted generation of pixels of a light distribution, and which is set up so that individual imaging elements are actuated separately via pulse width modulation to specify the luminous flux generated by the imaging element through the ratio of the on-phases and the off-phases of the pulse width modulation. A camera features an image sensor with a plurality of sensor elements read out consecutively to detect image information from different solid angle ranges illuminated by the headlamp. A control unit actuates the headlamp and the camera, and regulates temporal overlap between on-phases of the actuation of an imaging element and reading out of at least one sensor element of the camera which is hit by light generated by the imaging element, depending on the size of luminous flux generated by the imaging element.

15 Claims, 1 Drawing Sheet

DEVICE AND METHOD FOR SYNCHRONIZING A HEADLAMP OF A MOTOR VEHICLE USING A CAMERA

CROSS REFERENCE

This application claims priority to German Patent Application 10 2022 113068.1, filed May 24, 2022, the entirety of which is hereby incorporated by reference.

FIELD OF THE INVENTION

The present invention relates to a device for synchronizing a headlamp of a motor vehicle using a camera, as well as a method of synchronizing a headlamp of a motor vehicle using a camera.

BACKGROUND OF THE INVENTION

Camera systems for detecting the surroundings of a motor vehicle are sufficiently well known. Some of these camera systems have difficulties at times to detect the vehicle's surroundings in the dark. In principle, unwanted effects, such as interference or rolling shutter effects, may occur with pulse width modulation-controlled headlamps and camera systems. Furthermore, in the current state of technology the light of the headlamps are usually not utilized completely by the camera because off-phases of the pulse width modulation are also included.

A device and a method of the kind described at the beginning are known from DE 10 2016 007 591 A1. The device described therein comprises a matrix LED headlamp in which the light emitting diodes are actuated by means of pulse width modulation. In this case, the light-emitting diodes and the camera are actuated in a synchronized manner such that the camera is illuminated when the light-emitting diodes generate a high luminous flux.

With such a method and such a device, it proves to be disadvantageous that with a light distribution generated by the headlamp with very bright and very dark areas, such as with a low-beam light distribution with a light/dark cut-off line, the image detected by the camera features a very wide dynamic range. This can lead to underexposed and saturated areas in which information is lost.

BRIEF SUMMARY OF THE INVENTION

The problem underlying the present invention is creating a device of the kind referred to at the beginning of the document and stating a method of the kind referred to at the beginning of the document in which the dynamic range of the image detected by the camera is reduced. Furthermore, a motor vehicle with such a device needs to be specified.

In one embodiment, it is intended for the image sensor of the camera to feature a plurality of sensor elements arranged in the shape of a matrix or an array to detect image information from different solid angle ranges, for the camera to be set up to read out individual sensor elements or groups of sensor elements consecutively and that the control unit is set up to regulate the temporal overlap between the on-phases of the actuation of an imaging element and the reading out of at least one sensor element of the camera which is hit by the light generated by the imaging element, depending on the size of the luminous flux generated by the imaging element. This targeted phase matching of the actuation of individual imaging elements and individual sensor elements makes it possible to reduce the dynamic range of the image detected by the camera. This means, for example, that the camera does not perceive the effect of a light/dark cut-off line. Furthermore, the device can reduce or prevent interference effects or rolling shutter effects and at the same time increase the efficiency of the illumination of the vehicle lighting for the camera.

The headlamp and the camera can be part of a system for generating an anti-glare high beam (ADB). In such a case the phase of the pulse width modulation of individual imaging elements the light of which is emitted in different solid angle ranges can be varied through the angle depending on the size of the luminous flux generated by the imaging elements. The synchronization of this variation of the phase with the reading-out of the camera gives rise to the desired reduction in the dynamic range of the image detected by the camera.

It can be intended that the control unit is set up to regulate the temporal overlap between the on-phases of the actuation of the imaging elements and the reading out of the sensor elements of the camera which are hit by the light generated by the imaging elements in such a way, depending on the size of the luminous fluxes generated by the imaging elements, that the light distribution detected by the camera differs from the light distribution perceptible by a human observer in front of the motor vehicle. This means the light distribution that is visible for the camera can be detached from the light distribution perceived by the human eye. The device can, therefore, adjust the dynamic range of the image detected by the camera independently of the light distribution generated by the headlamp.

There is the possibility of the headlamp being set up to actuate a first imaging element through a pulse-width modulation in order to generate a luminous flux emanating from the first imaging element and to actuate a second imaging element through a pulse-width modulation, to generate a second luminous flux emanating from the second imaging element that is larger than the first luminous flux. In this respect, the control unit can be set up to actuate the headlamp and the camera in such a way that the temporal overlap between the on-phases of the actuation of the first imaging element and the reading out of at least one first sensor element of the camera, which is hit by the light generated by the first imaging element, is at most 50% greater than, in particular at most 20% greater than, preferentially roughly the same size as the temporal overlap between the on-phases of the actuation of the second imaging element and the reading out of at least one second sensor element of the camera, which is hit by the light generated by the second imaging element. These measures can lead to a targeted reduction in the luminous intensity of parts of the image detected by the camera so that overexposure or saturation can be prevented. Furthermore, these measures can lead to a targeted increase in the luminous intensity of other parts of the image detected by the camera such that underexposure can also be prevented.

It can be intended for the headlamp to be set up to generated a low-beam light distribution with a light/dark cut-off line where the light generated by the first imaging element is emitted in a solid angle range that is arranged above the light/dark cut-off line and where the light generated by the second imaging element is emitted in a solid angle range that is arranged below the light/dark cut-off line. In this way, the dynamic range of the image detected by the camera is reduced with a low-beam distribution with a light/dark cut-off line.

There is the possibility that the size and/or the shape of the solid angle range into which the light of one of the imaging elements is emitted is different from the size and/or the shape of the solid angle range from which a sensor element of the image sensor detects image information.

As an alternative, it can be intended for the size and/or the shape of the solid angle range into which the light of one of the imaging elements is emitted, corresponds to the size and/or the shape of the solid angle range from which a sensor element of the image sensor detects image information.

It can be intended for the camera to be set up to read out individual sensor elements line-by-line or row-by-row. Even with line-by-line or row-by-row reading out of the sensor elements, the temporal overlap between the on-phases of the actuation of the imaging elements and the reading out of the sensor element can be set in a suitable manner.

There is the possibility for the imaging elements on the least one active surface to take the form of light emitting diodes or as laser diodes, specifically where the imaging component is a solid state LED array. In this respect, the solid state LED array can, for example, also take the form of an SSL|HD module.

An alternative option is for the imaging component to take the form of a digital micromirror device or an LCoS or LC display or the imaging component to comprise a digital micromirror device or an LCoS or LC display. In this case, the illumination device additionally comprises at least one light source to illuminate the imaging elements of the digital micromirror device or of the LCoS or of the LC display.

In another embodiment, it is intended for the image sensor of the camera to feature a plurality of sensor elements arranged in the shape of a matrix or an array to detect image information from different solid angle ranges, for the camera to read out individual sensor elements or groups of sensor elements consecutively and that the temporal overlap between the on-phases of the actuation of an imaging element and the reading out of at least one sensor element of the camera which is hit by the light generated by the imaging element, depending on the size of the luminous flux generated by the imaging element. In particular, the method can be implemented in this respect with an inventive device.

With the method, it can also be intended for a first imaging element to be actuated via pulse width modulation in such a way that it generates a first luminous flux and that a second imaging element is actuated via pulse width modulation in such a way that it generates a second luminous flux that is larger than the first luminous flux. In this respect, the headlamp and the camera can be actuated in such a way that the temporal overlap between the on-phases of the actuation of the first imaging element and the reading out of at least one first sensor element of the camera, which is hit by the light generated by the first imaging element, is at most 50% greater than, in particular at most 20% greater than, preferentially roughly the same size as the temporal overlap between the on-phases of the actuation of the second imaging element and the reading out of at least one second sensor element of the camera which is hit by the light generated by the second imaging element.

In another embodiment, the motor vehicle comprises an inventive device.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the figures, identical components and components with identical functions have been given the same reference numbers.

Figure 1:
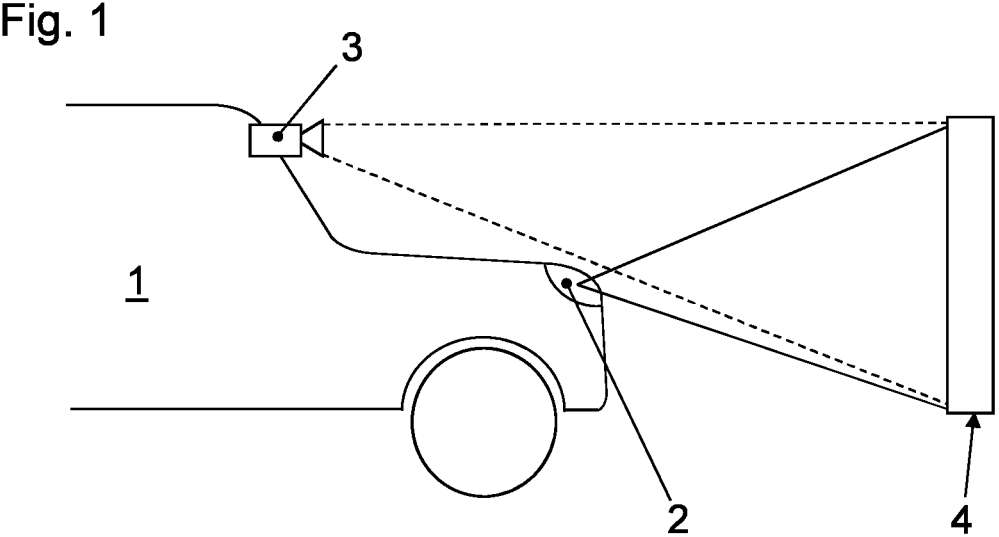
FIG. 1 is a schematic side view of part of a motor vehicle with an inventive device.

The motor vehicle 1 shown in FIG. 1 comprises two headlamps 2 and a camera 3 that is arranged for example at the front end of the roof or in the upper area of the windshield of the motor vehicle 1. The device further comprises a control unit (not shown) for actuating the headlamp 2 and the camera 3.

The headlamp 2 can, in particular, be a high resolution headlamp with a solid state LED array (not shown) that acts as an imaging component. The solid state LED array comprises a plurality of light-emitting diodes (LEDs) arranged in the shape of a matrix that serve as imaging elements for the targeted generation of pixels of a light distribution. In this context, a solid angle range corresponds to each of the pixels to be generated; the light of one of the light-emitting diodes corresponding to the respective pixel is emitted into this solid angle range. The light-emitting diodes can be actuated separately via pulse width modulation in order to specify the luminous flux generated by the corresponding light-emitting diode through the ratio of the on-phases and the off-phases of the pulse width modulation.

It is entirely possible to provide for a digital micromirror device (DMD) or an LCoS or an LCD display as an imaging component in the headlamp instead of a solid state LED array. In this respect, the headlamp will then additionally comprise at least one light source to illuminate the imaging elements of the digital micromirror device or of the LCoS or of the LC display.

The camera 3 comprises an image sensor (not shown) featuring a plurality of sensor elements arranged in the shape of a matrix or an array in order to detect image information from different solid angle ranges illuminated by the headlamp 2 in front of the motor vehicle 1. The camera is set up to read out individual sensor elements or groups of sensor element consecutively. In this respect, the sensor elements can be read out, for example, line-by-line or row-by-row. Reading out of the sensor elements can be performed by signals of a pulse width modulation in such a way that corresponding sensor element is read out in on-phases of the pulse width modulation and the corresponding sensor element is not read out in off-phases of the pulse width modulation.

Figure 2:
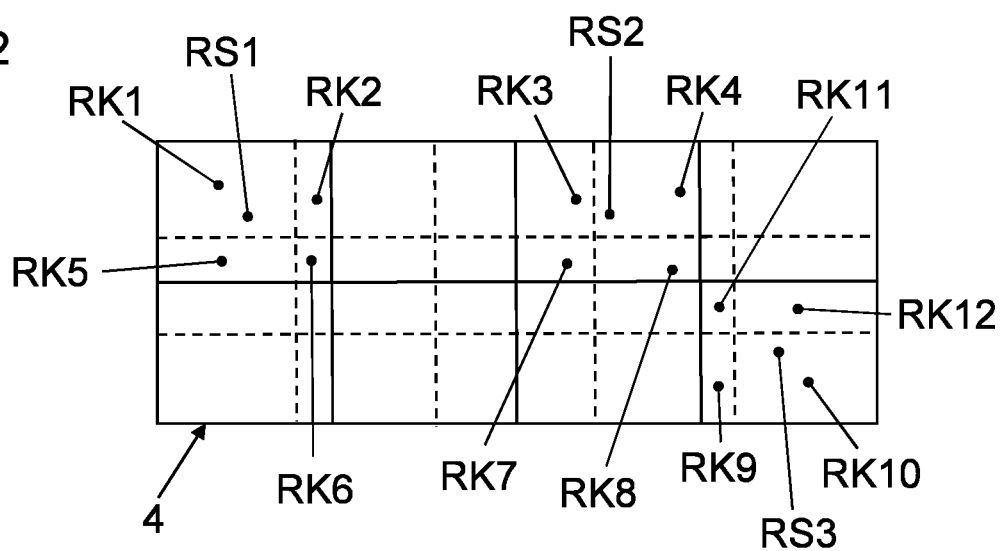
FIG. 2 is a schematic representation of the detection range of the camera and the illumination area of the headlamp of an inventive device.

FIG. 1 and FIG. 2 show schematically an area 4 in front of the motor vehicle 1 in which the detection range of the camera and the illumination area of the headlamp overlap. In particular, individual pixels of camera 3 overlap in a defined manner with light-emitting diode pixels of the headlamp 2. In this respect, the illumination area of the headlamp 2 is subdivided by solid lines into individual solid angle ranges into which the light of the corresponding light-emitting diodes is emitted. Furthermore, the detection range of the camera 3 is subdivided by solid lines into individual solid angle ranges from which the corresponding sensor elements of the image sensor detect image information.

The light distribution generated by the headlamp 2 can, for example, be a low-beam light distribution with a light/dark cut-off line. In this case, for example, the luminous intensities generated by the headlamp in the solid angle ranges RS1 and RS2 that are above the light/dark cut-off line are significantly smaller than the luminous intensity in the solid angle range RS3 that is located below the light/dark cut-off line.

It is shown that with the subdivision performed the solid angle ranges of the illumination area of the headlamp 2 feature a different shape and a different size than the solid angle ranges of the detection range of the camera 3. For this reason, the light emitted into the solid angle range RS1, for example, is distributed among several solid angle ranges RK1, RK2, RK5, RK6 from which corresponding sensor elements of the image sensor detect image information. The light emitted into the solid angle range RS2 is also distributed among several solid angle ranges RK3, RK4, RK7, RK8 from which corresponding sensor elements of the image sensor detect image information. The light emitted into the solid angle range RS3 is also distributed among several solid angle ranges RK9, RK10, RK11, RK12 from which corresponding sensor elements of the image sensor detect image information.

Figure 3:
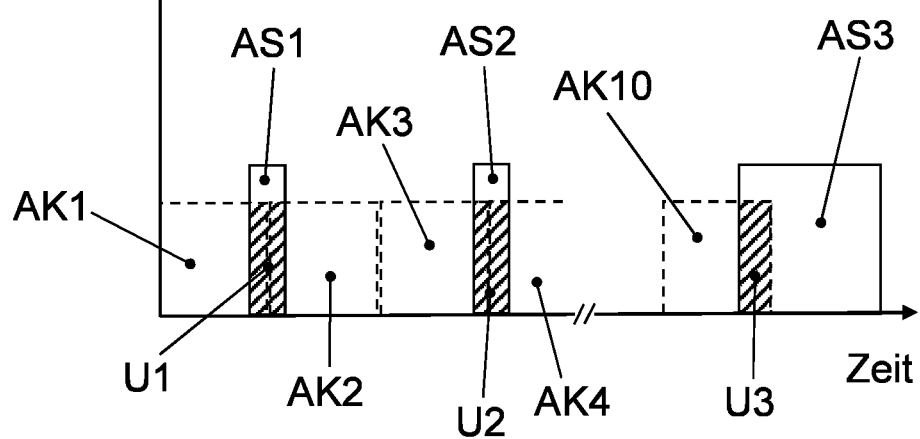
FIG. 3 is a diagram showing schematically the amplitude of the actuation signals for the camera and the headlamp against time.

FIG. 3 shows the process over time of the actuation of individual light-emitting diodes and individual sensor elements. In this respect, the amplitude of the respective pulse width modulation signal is shown against time, where in particular the on-phases of the actuation signals can be seen from FIG. 3. The reading-out periods of the camera pixels are layered with the actuation periods of the headlamp pixels using a suitable shift in the phases.

In this respect, the actuation periods or, as the case may be, the on-phases AS1, AS2 and AS3 for actuation of light-emitting diodes the light of which is emitted into the solid angle ranges RS1, RS2 and RS3. Furthermore, the reading-out times or, as the case may be, the on-phases AK1, AK2, AK3, AK4 and AKIO for reading out sensor elements that detect image information from the solid angle ranges RK1, RK2, RK3, RK4 and RK10.

It is shown that the actuation periods corresponding to the on-phases AS1 and AS2 of the pulse width modulation that bring about the emission of light into the solid angle ranges RS1 and RS2 that are located above the light/dark cut-off line are significantly shorter that the actuation period corresponding to the on-phase AS3 of the pulse width modulation that brings about the emission of light into the solid angle range RS3 that is located below the light/dark cut-off line. This means that the luminous flux emitted from the corresponding light-emitting diodes is significantly smaller with the shorter on-phases AS1 and AS2 than with the longer on-phase AS3. Correspondingly, the luminous intensity in the solid angle range RS3 located below the light/dark cut-off line is significantly greater than in the solid angle ranges RS1 and RS2. This is entirely desired with a low-beam light distribution.

On the basis of these luminous intensities in the solid angles RS1, RS2 and RS3, the control unit actuates the headlamp 2 and the camera 3 in such a way that the temporal overlap U1, U2 between the on-phases AS1 and AS2 of the corresponding light-emitting diodes and the on-phases AK1, AK2, AK3 and AK4 of the corresponding sensor elements are each roughly the same size as the temporal overlap U3 between the on-phase AS3 of the corresponding light-emitting diode and the on-phase AKIO of the corresponding sensor element. Because the on-phase AS3 is significantly longer in duration than the on-phases AS1 and AS2, the on-phase AS3 is shifted temporally in order to align the overlaps U1, U2, U3 (see FIG. 3).

Though the roughly identical sizes of the temporal overlap U1, U2, U3 between the on-phases AS1 and AS2 of the corresponding light-emitting diodes and the on-phases AK1, AK2, AK3 and AK4 of the corresponding sensor elements on the one hand and between the on-phase AS3 of the corresponding light-emitting diode and the on-phase AKIO of the corresponding sensor element on the other, the camera detects a comparatively homogeneous illumination of the solid angle ranges RS1, RS2 and RS3, whereas the human eye sees a significantly stronger illumination in the solid angle range.

LIST OF REFERENCE NUMBERS

1 Motor vehicle
2 Headlamp
3 Camera
4 Area in front of the motor vehicle
RS1-RS3 Solid angle range in which a light-emitting diode emits light
RK1-RK12 Solid angle range from which a sensor element detects image information
AS1-AS3 On-phase for actuating a light-emitting diode
AK1-AK4, On-phase for reading out a sensor element
AK9
U1-U3 Temporal overlap between the on-phase for actuating a light-emitting diode and the on-phase for reading out a sensor element

The invention claimed is:

1. A device for synchronizing a headlamp of a motor vehicle with a camera, the device comprising:
   a headlamp including an imaging component with an active surface on which imaging elements are arranged in the shape of a matrix or an array for targeted generation of pixels of a light distribution, where a solid angle range (RS1-RS3) corresponds to each of the pixels to be generated, where light of an imaging element corresponding to the respective pixel is emitted into the solid angle range, where the headlamp is set up such that individual imaging elements are actuated separately through pulse width modulation to specify luminous flux generated by the imaging element through the ratio of on-phases (AS1-AS3) and off-phases of the pulse width modulation,
   a camera including an image sensor to detect image information from solid angle ranges (RK1-RK12) illuminated by the headlamp in front of the motor vehicle,
   a control unit for actuating the headlamp and the camera,
   wherein an image sensor of the camera includes a plurality of sensor elements arranged in a shape of a matrix or an array to detect image information from different solid angle ranges (RK1-RK12),
   wherein the camera is set up to read out individual sensor elements or groups of sensor elements consecutively, and
   wherein the control unit is set up to regulate a temporal overlap (U1-U3) between the on-phases (AS1-AS3) of the actuation of an imaging element and the reading out of at least one sensor element of the camera that is hit by the light generated by the imaging element depending on the size of luminous flux generated by the imaging element.

2. The device in accordance with claim 1, wherein the control unit regulates the temporal overlap (U1-U3) between the on-phases (AS1-AS3) of the actuation of the imaging elements and the reading out of the sensor elements of the camera which are hit by the light generated by the imaging elements in such a way, depending on the size of the luminous fluxes generated by the imaging elements, that the light distribution detected by the camera differs from the light distribution perceptible by a human observer in front of the motor vehicle.

3. The device in accordance with claim 1, wherein the headlamp actuates a first imaging element through a pulse-width modulation to generate a luminous flux emanating from the first imaging element and actuates a second imaging element through a pulse-width modulation, to generate a second luminous flux emanating from the second imaging element that is larger than the first luminous flux.

4. The device in accordance with claim 3, wherein the control unit actuates the headlamp and the camera such that the temporal overlap (U1, U2) between the on-phases (AS1, AS2) of the actuation of the first imaging element and the reading out of at least one first sensor element of the camera which is hit by the light generated by the first imaging element is at most 50% greater than the temporal overlap (U3) between the on-phases (AS3) of the actuation of the second imaging element and the reading out of at least one second sensor element of the camera which is hit by the light generated by the second imaging element.

5. The device in accordance with claim 3, wherein the headlamp generates a low-beam light distribution with a light/dark cut-off line where the light generated by the first imaging element is emitted in a solid angle range (RS1, RS2) that is arranged above the light/dark cut-off line and where the light generated by the second imaging element is emitted in a solid angle range (RS3) that is arranged below the light/dark cut-off line.

6. The device in accordance with claim 1, wherein a size and/or shape of the solid angle range (RS1-RS3) into which the light of one of the imaging elements is emitted is different from a size and/or shape of the solid angle range (RK1-RK12) from which a sensor element of the image sensor detects image information.

7. The device in accordance with claim 1, wherein a size and/or shape of the solid angle range (RS1-RS3) into which the light of one of the imaging elements is emitted corresponds to a size and/or shape of the solid angle range (RK1-RK12) from which a sensor element of the imaging sensor detects image information.

8. The device in accordance with claim 1, wherein the camera reads out individual sensor elements line-by-line or row-by-row.

9. The device in accordance with claim 1, wherein the imaging elements on the least one active surface are light emitting diodes or laser diodes.

10. The device in accordance with claim 1, wherein the imaging component is a digital micromirror device or an LCoS or LC display, or the imaging component comprises a digital micromirror device or an LCOS or an LC display.

11. A method of synchronizing a headlamp of a motor vehicle with a camera, where the headlamp includes an imaging component with an active surface on which imaging elements are arranged in a shape of a matrix or an array for the targeted generation of pixels of a light distribution, where a solid angle range (RS1-RS3) corresponds to each pixel to be generated into which solid angle range the light of an imaging element corresponding to a respective pixel is emitted, where the headlamp actuates individual imaging elements separately via pulse width modulation to specify the luminous flux generated by the imaging element through a ratio of on-phases (AS1-AS3) and off-phases of the pulse width modulation and where the camera features an image sensor in order to detect image information from the solid angle ranges (RK1-RK12) illuminated by the headlamp in front of the motor vehicle, the method comprising the steps of:
 detecting image information, via the image sensor of the camera which includes a plurality of sensor elements arranged in the shape of a matrix or an array, from different solid angle ranges (RK1-RK12),
 reading out consecutively individual sensor elements or groups of sensor elements via the camera, and
 regulating the temporal overlap (U1-U3) between the on-phases of the actuation (AS1-AS3) of an imaging element and the reading out of at least one sensor element of the camera which is hit by the light generated by the imaging element, depending on a size of the luminous flux generated by the imaging element.

12. A method of synchronizing a headlamp of a motor vehicle with a camera, where the headlamp includes an imaging component with an active surface on which imaging elements are arranged in a shape of a matrix or an array for the targeted generation of pixels of a light distribution, where a solid angle range (RS1-RS3) corresponds to each pixel to be generated into which solid angle range the light of an imaging element corresponding to a respective pixel is emitted, where the headlamp actuates individual imaging elements separately via pulse width modulation to specify the luminous flux generated by the imaging element through a ratio of on-phases (AS1-AS3) and off-phases of the pulse width modulation and where the camera features an image sensor in order to detect image information from the solid angle ranges (RK1-RK12) illuminated by the headlamp in front of the motor vehicle, the method comprising the steps of:
 detecting image information, via the image sensor of the camera which includes a plurality of sensor elements arranged in the shape of a matrix or an array, from different solid angle ranges (RK1-RK12),
 reading out consecutively individual sensor elements or groups of sensor elements via the camera,
 regulating the temporal overlap (U1-U3) between the on-phases of the actuation (AS1-AS3) of an imaging element and the reading out of at least one sensor element of the camera which is hit by the light generated by the imaging element, depending on a size of the luminous flux generated by the imaging element, and
 wherein the method is implemented with a device in accordance with claim 1.

13. The method in accordance with claim 11, wherein a first imaging element is actuated via pulse width modulation such that it generates a first luminous flux and wherein a second imaging element is actuated via pulse width modulation such that it generates a second luminous flux that is larger than the first luminous flux.

14. The method in accordance with claim 13, wherein the headlamp and the camera are actuated such that the temporal overlap (U1, U2) between the on-phases (AS1, AS2) of the actuation of the first imaging element and the reading out of at least one first sensor element of the camera which is hit by the light generated by the first imaging element is at most 50% greater than as the temporal overlap (U3) between the on-phases (AS3) of the actuation of the second imaging element and the reading out of at least one second sensor element of the camera which is hit by the light generated by the second imaging element.

15. A motor vehicle, comprising a device in accordance with claim 1.

\* \* \* \* \*